United States Patent
Rothschild (10) Patent No.: US 8,799,088 B2
(45) Date of Patent: Aug. 5, 2014

(54) SYSTEM AND METHOD FOR VERIFYING USER IDENTITY INFORMATION IN FINANCIAL TRANSACTIONS

(76) Inventor: Leigh M. Rothschild, Sunny Isles Beach, FL (US)

( * ) Notice: Subject to any disclaimer, the term of this patent is extended or adjusted under 35 U.S.C. 154(b) by 0 days.

(21) Appl. No.: 12/854,598

(22) Filed: Aug. 11, 2010

(65) Prior Publication Data

US 2010/0325002 A1 Dec. 23, 2010

Related U.S. Application Data

(63) Continuation of application No. 12/157,576, filed on Jun. 11, 2008, now abandoned.

(51) Int. Cl.
G06Q 20/00 (2012.01)
G06K 5/00 (2006.01)

(52) U.S. Cl.
USPC ............................... 705/18; 705/16; 235/380

(58) Field of Classification Search
None
See application file for complete search history.

(56) References Cited

U.S. PATENT DOCUMENTS

| 5,657,389 | A  | * | 8/1997  | Houvener ...................... 713/186 |
| 6,591,249 | B2 | * | 7/2003  | Zoka ............................... 705/18 |
| 6,776,332 | B2 |   | 8/2004  | Allen et al. |
| 6,968,457 | B2 |   | 11/2005 | Tam |
| 7,103,573 | B2 |   | 9/2006  | Mobed et al. |
| 7,152,786 | B2 |   | 12/2006 | Brundage et al. |

* cited by examiner

Primary Examiner — Mussa A Shaawat
(74) Attorney, Agent, or Firm — Atanu Das; Tech Law LLP (57) ABSTRACT

A system and method for verifying a user's identity during a point-of-sale transaction are provided. The system and method provide for applying for, receiving and verifying a financial services provider card; providing a plurality of requested biometric identification data to a financial services provider; uploading the plurality of biometric identification data of a user requested by the financial services provider via a network connected computing device to a preselected website; storing the plurality of biometric identification data in a remote server coupled to the preselected website; and using the plurality of requested biometric identification data to execute a point-of-sale transaction, wherein a merchant can verify the financial services card with the biometric identification data provided by the remote server or provided by the user via a point-of-sale terminal.

21 Claims, 4 Drawing Sheets

SYSTEM AND METHOD FOR VERIFYING USER IDENTITY INFORMATION IN FINANCIAL TRANSACTIONS

PRIORITY

The present application is a continuation application of U.S. patent application Ser. No. 12/157,576, filed Jun. 11, 2008, the contents of which are hereby incorporated by reference in their entirety.

FIELD

The present disclosure relates generally to data processing and financial decision systems. More particularly, to a system and method of using biometric identification data to verify the identity of a user of a financial services card.

DESCRIPTION OF THE RELATED ART

The provision of credit cards to customers is an enormous global business and a large part of the world's economy. Despite credit risk and credit card fraud, which are large factors in the industry, financial service providers (FSP) are motivated to issue credit cards because of the high profit associated with an individual credit card. A credit card issuer may, for example, charge interest on unpaid balances that far exceeds the vendor's cost of extending credit, thus reaping a large profit.

However, due to credit card fraud and identity theft that have increasingly become a serious problem in the credit card industry, customers might legitimately be wary about signing up for a new card or even using credit cards they have freely used in the past. Increasingly, there are stories of monetary theft and identity theft in the news; such reports could legitimately make customers believe that it was unsafe to use a credit card for any simple transaction, even buying a quart of milk in a grocery store.

To help minimize fraud, positive identity verification is critical in all types of transactions and security procedures. Currently, for example, the use of pin numbers or a visual comparison, by the person responsible for identity verification, e.g., a cashier, of the buyer's signature or facial image with that on the card may be used to help establish identity of the card user. However, there are several problems with this system. For example, signatures and facial images can be altered, thereby allowing for fraudulent alteration of the verification data and, thus a fraudulent purchase. In addition, the current process of verification does not ensure that the individual responsible for the identity verification will even perform, much less accurately perform, the identity verification steps needed to help validate that the user of the card is in fact the owner of the card, and thus minimize the risk of fraud in the transaction.

Therefore, a need exists for a positive identity verification system that stores a credit card customer's identity data, e.g., biometric identification data, in a remote server located, for example, at the site of the financial service provider (FSP) or within a network where many financial service providers have access to the same individual's identity data. Storing biometric identification data in a remote server dramatically reduces the chance that theft will occur due to the lack of access to the biometric verification medium by the thief, whose biometrics would not match that of the customer whose card was stolen. Another need exists for the system and method of credit card identity validation to be independent of the credit cards whose customers the system is designed to positively identify.

SUMMARY

A system and method for user identification verification when using a financial service provider card during a point-of-sale transaction by comparing the user's biometric information to the cardholder's biometric identification data previously stored on a remote server are provided. Generally, a financial services card is applied for, received and verified. Once verified, the financial service provider requests that the user provide biometric identification data. The biometric identification data is uploaded via a network connected user computer or terminal to a preselected website coupled to a remote server having a database.

The biometric identification data is stored and then accessed when required via an identified financial service provider card. To execute a transaction, a financial service provider card is provided at a point-of-sale terminal which is coupled via a communications network to the remote server. An identifier or the like is read from the card and the card identity is transmitted to the remote server. In one embodiment, the biometric identification data of the card's user is obtained at the point-of-sale terminal after the user presents the card to the point-of-sale terminal. The remote server then accesses the card owner's biometric identification data previously stored on the remote server based on the card identity, compares the user's biometric data to the owner's pre-stored biometric information, and transmits a verification of identity back to the point-of-sale terminal via the communications network. In another embodiment, the pre-stored biometric information is transmitted to the point-of-sale (POS) terminal from the remote server after the remote server has received the card identity and the verification is performed at the POS terminal.

In one aspect of the present disclosure, a method of requiring a user of a financial services card provider card to provide biometric identification data to a remote server of a financial services provider to verify the identity of the user is provided. The method includes applying for, receiving and verifying a financial services provider card; providing a plurality of requested biometric identification data to a financial services provider; uploading the plurality of biometric identification data of the user requested by the financial services provider via a network connected computing device to a preselected website; storing the plurality of biometric identification data in a remote server coupled to the preselected website; and, using the plurality of requested biometric identification data to execute a point-of-sale transaction, wherein a merchant can verify the financial services card with the biometric identification data provided by the remote server or provided by the user via a point-of-sale terminal.

In another aspect, a method for positively authenticating a user identity relying on biometric identification for verifying a financial services provider card is provided. The method includes presenting the financial services provider card to a point-of-sale terminal to identify the card to the point-of-sale terminal and to a network connected remote server database; inputting at least one user biometric identification data to be positively identified into the point-of-sale terminal; uploading at least one user biometric identification data to be positively identified from the point-of-sale terminal to the network connected remote server database; establishing communications between the point-of-sale terminal and the remote database, the database having stored therein a plurality of user biometric identification data; transmitting at least one verified biometric identification data from the database to the point-of-sale terminal through the network; displaying at least one verified biometric identification data into point-of-sale terminal to indicate the database has compared and positively identified the at least one biometric identification data corresponding to the biometric identification data entered into the database by the user; and, validating the user identity of the financial services card.

A system for using biometric identification data to positively identify a user of a financial services card includes a remote server including a database for storing biometric data associated with a financial service provider card, the card being cross associated with a card identity; a network connected personal computing device configured for uploading biometric data associated with the card and for transmitting the biometric data associated with the card to the remote server; a terminal configured for receiving biometric data for the user, establishing a card identity and for transmitting the information to the remote server; and, wherein the remote server is configured to verify the biometric data for the card for a transaction by retrieving a customer biometric identification data record from the database, determining if the biometric identification data input into the terminal matches the biometric identification data retrieved from the database and sending a validation to the terminal if the biometric identification data entered into the terminal matches the biometric identification data retrieved from the database.

In a further aspect, a method for positively authenticating a user identity with an identification card is provided. The method includes presenting the identification card to a terminal to identify the card to the terminal and to a network connected remote server database; uploading the card identity from the terminal to the network connected remote server database; accessing at least one verified, pre-stored biometric data of the user from the remote server database based on the card identity; transmitting the at least one verified, pre-stored biometric identification data from the database to the terminal through the network; displaying the at least one verified, pre-stored biometric identification data at the terminal; and validating the user identity. In one aspect, the validating step further includes receiving at least one biometric data from the user; and comparing the received at least one biometric data with the at least one verified, pre-stored biometric identification data. In one aspect, the comparison step is performed at the terminal and, in another aspect, the comparison step is performed at the remote server.

In a further aspect, the comparing step is a digital photographic image comparison or a digital signature comparison.

BRIEF DESCRIPTION OF THE DRAWINGS

The above and other aspects, features, and advantages of the present disclosure will become more apparent in light of the following detailed description when taken in conjunction with the accompanying drawing in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for identity verification of a credit card customer are provided. The system and method of the present disclosure enables a financial service provider to sign up customers for their proprietary credit card without credit risk to the merchant or fraud and identity theft risk to the customer. The present system and method develops, maintains and uses a secure and authentic database on a remote server of biometric identification data, for example, digital photographic images, digital signature comparisons and other data unique to an individual for positive identification purposes. The system and method includes accessing the remote server database in a secure and cost effective manner, a method for performing positive identity verification when issuing the financial services card and a method for positively identifying a customer during a point-of-sale transaction based on biometric identification information held in a database on the remote server of the financial service provider (FSP).

The system and method of the present disclosure is disclosed herein with particular reference to a point-of-sale system, where a credit card, debit card or any other type of financial services card is presented by a consumer or customers to make a purchase. However, it is understood that the positive identity verification system and method of the disclosure herein is adaptable to any application where positive identification of a person is required. Such alternative applications comprise checking and banking transactions, firearm sales, food stamp reimbursement, and a host of other applications related to the welfare, voting, law enforcement, health care, airline, immigration and naturalization fields.

The financial services card account is applied for, either manually, by filling out a paper application, telephonically or on-line by accessing a preselected website and filling out the required fields for the application through a user or customer terminal or server, etc. The user or customer provides the requested application data, and upon approval, the credit card is sent to the user. The user logs on to a preselected identification verification website coupled to a remote server for user identification verification using software including, but not limited to, NetIDme by NetIDme of the United Kingdom.

Once the user is verified as the true user of the provided financial services card, the user is requested by the financial services provider to provide biometric identification information data. The biometric identification information data is then uploaded through a communications network connected user terminal to a remote server database coupled to the preselected website of the selected financial service provider.

When the user uses the financial services card to effect a transaction, the card is presented to a reader, e.g., an electronic data capture (EDC) swipe reader, of the point-of-sale terminal to identify the card. The point-of-sale terminal transmits the identification information to the remote server which accesses the pre-stored biometric identification data of the user. The pre-stored biometric identification data of the user may be compared with biometric identification data of the user entered into the point-of-sale terminal at the transaction site. The data is compared and verified.

Figure 1:
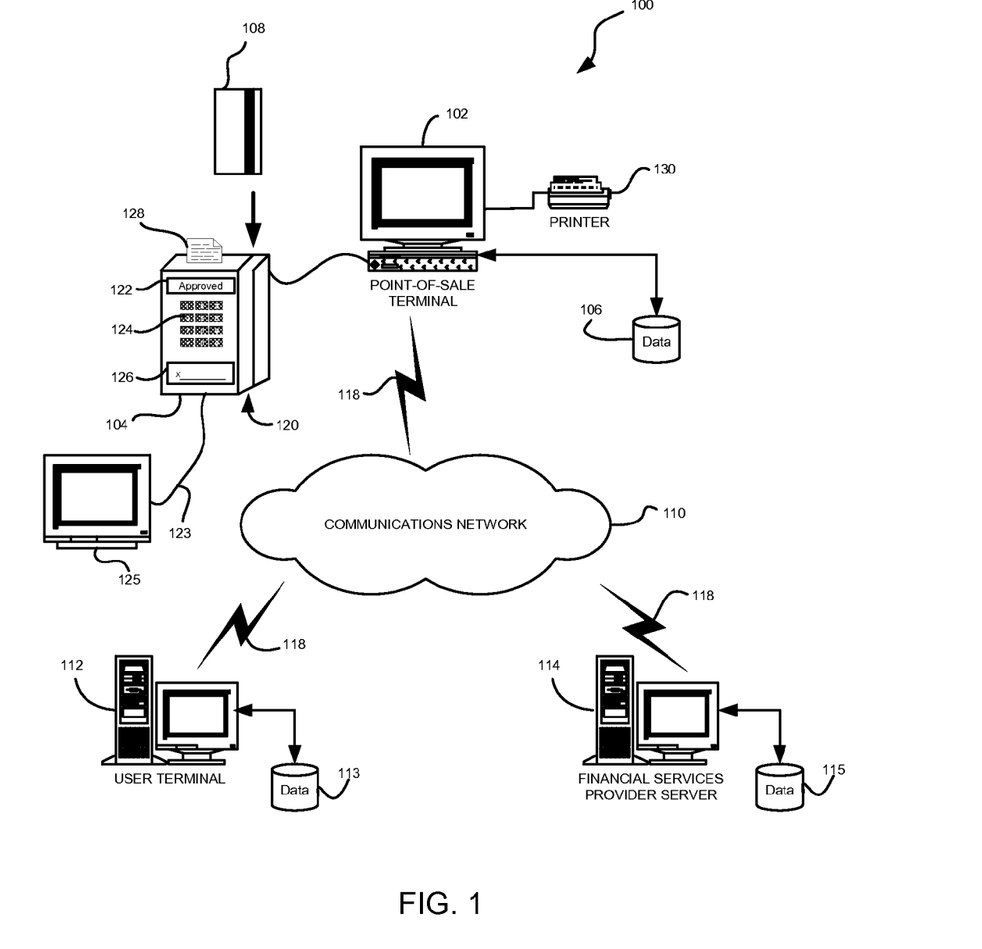
FIG. 1 is a diagram illustrating a system for verifying a user identity at a point of purchase using digital information stored in a remote server.

Referring to FIG. 1, a system 100 for credit card identity verification of a credit card customer is illustrated. The system 100 includes a point-of-sale (POS) terminal 102 for completing a purchasing transaction and an input/output (I/O) customer transaction terminal 104. The (I/O) terminal 104 includes an electronic data capture (EDC) swipe reader 120 for reading information from a credit card 108, a display 122 for providing information to a customer and a merchant, a keypad 124 for customer entry of information such as a PIN number, and a touch screen 126 for receiving a customer's signature. It is to be appreciated that reader 120 may be any known reader for reading information from card 108 including but not limited to a scanner for reading text or various symbologies, an electronic reader for reading RFID tags, etc. Touch screen 126 may also receive other biometric information. The (I/O) terminal 104 may also include an optional second display/touch screen 125 coupled to the terminal though wire cable 123 and USB port (not shown). Second display/touch screen 125 may be larger than touch screen 126. Second display/touch screen 125 is for entry and display of biometric information and optionally may include a camera for capturing an image of the user. Second display/touch screen 125 may also provide for entry of customer fingerprints, handprints, DNA, or retinal scanning or any other proven forms of identity verification. Second display/touch screen 125 may also provide for voice recognition through a prerecorded voice message that can be provided via digital voice recognition software using a standard pre-set message for comparison. Other biometric information that may be provided though second display/touch screen 125 includes, but is not limited to, a DNA fingerprint, a sequence profile, etc. Note that touch screen 125 and second display terminal/touch screen 126 may be the same unit. As one of ordinary skill in the art would recognize, a number of different series or combinations of displays and touch screens are available, and are of no consequence to the nature of this disclosure. The connection to (I/O) terminal 104 may be any connection now known or developed in the future, such as memory card, a modem, satellite relay, wireless connection, etc., for enabling communications between (I/O) terminal 104 and second display device 125.

The (I/O) terminal 104 may also include a printing mechanism 128 for printing receipts, or alternatively, the POS terminal 102 may include a printer 130 for printing receipts, terms, offers, etc.

The system 100 further includes user terminal 112 for entering application data and biometric identification data for a financial service provider and communication network 110 for enabling communications between POS terminal 102, user terminal 112 and financial services provider (FSP) remote server 114.

Figure 2:
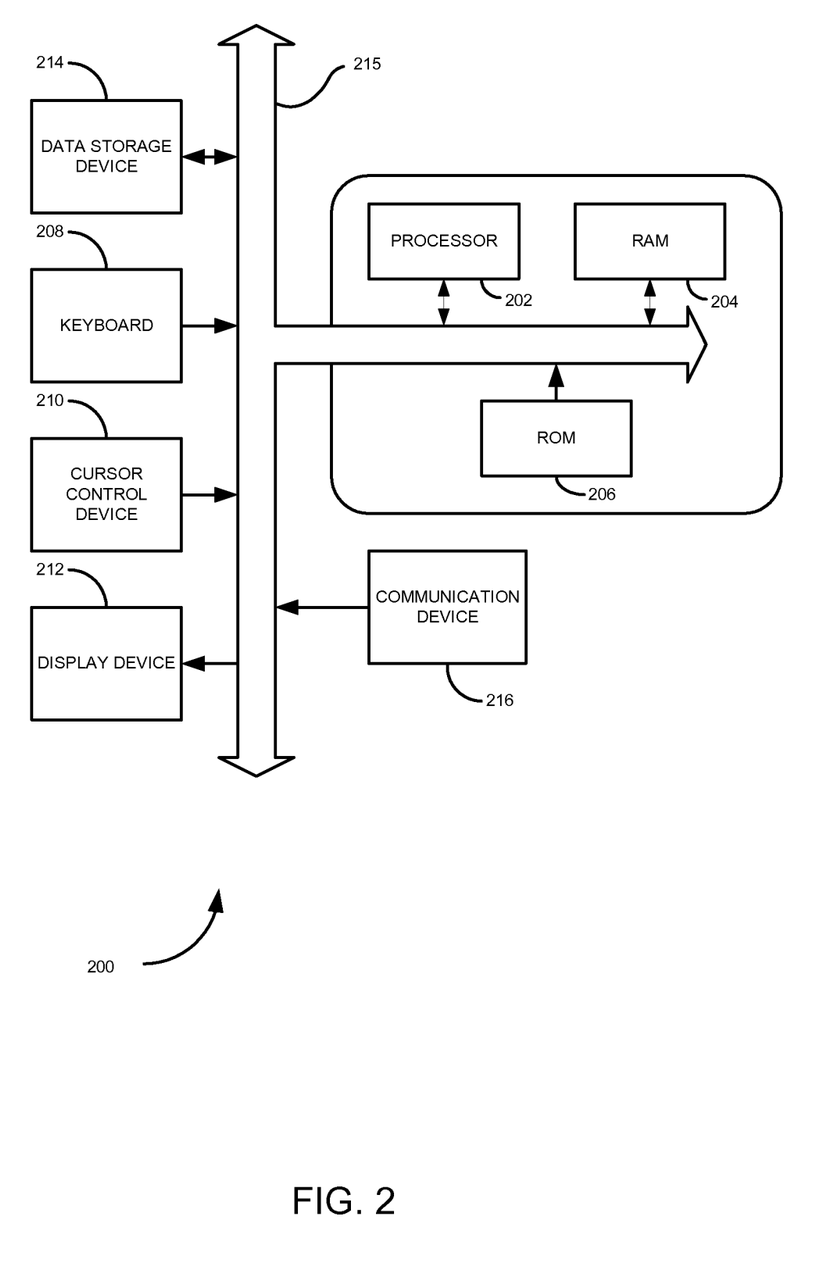
FIG. 2 is an exemplary computer for use in the system shown in FIG. 1.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine, e.g., point-of-sale terminal 102 or financial service provider remote server 114, comprising any suitable architecture such as a personal computer, a workstation or server. Referring to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. A system bus 215 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform by various interfaces and bus structures, such as a parallel port, serial port or universal serial bus (USB). One such peripheral device may include a communications device 216, e.g., a modem, satellite relay, wireless connection, etc., for enabling communications from the point-of-sale terminal 102 to various financial service providers, e.g., financial service provider 114. Other peripheral devices may include additional storage devices 214 and a printer.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The POS terminal 102 may operate in a networked environment using logical connections to one or more remote computers 114. The remote computer includes a database 115. The database 115 may include a plurality of records on customers or users of financial service provider cards. This information may be supplied on secured biometric identification data supplied by the credit card holder as a means to verify a financial service provider card holder's identity.

Remote computer 114 may be a personal computer, a server, a router, a network PC, a peer device or other common network node, and typically includes many or all of the elements described above relative to the machine 200. It is to be appreciated that the network 110 may be a local area network (LAN), wide area network (WAN), the Internet or any known network that couples a plurality of computers to enable various modes of communication via network messages. For example, the system may be a corporate intranet including a single server and multiple POS terminals housed within a single facility, or alternatively, multiple servers with multiple POS terminals located in various geographic locations. The POS terminals may communicate to the server 114 and network 110 via any known communication link 118, for example, dial-up, hardwired, cable, DSL, satellite, cellular, PCS, wireless transmission (e.g., 802.11a/b/g), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices, e.g., POS terminal 102 and remote server 114, may employ Hypertext Transfer Protocol Secure (HTTPs), Secure Sockets Layer (SSL) Protocol, Secure Electronic Transaction (SEC) Protocol, etc.

Figure 3:
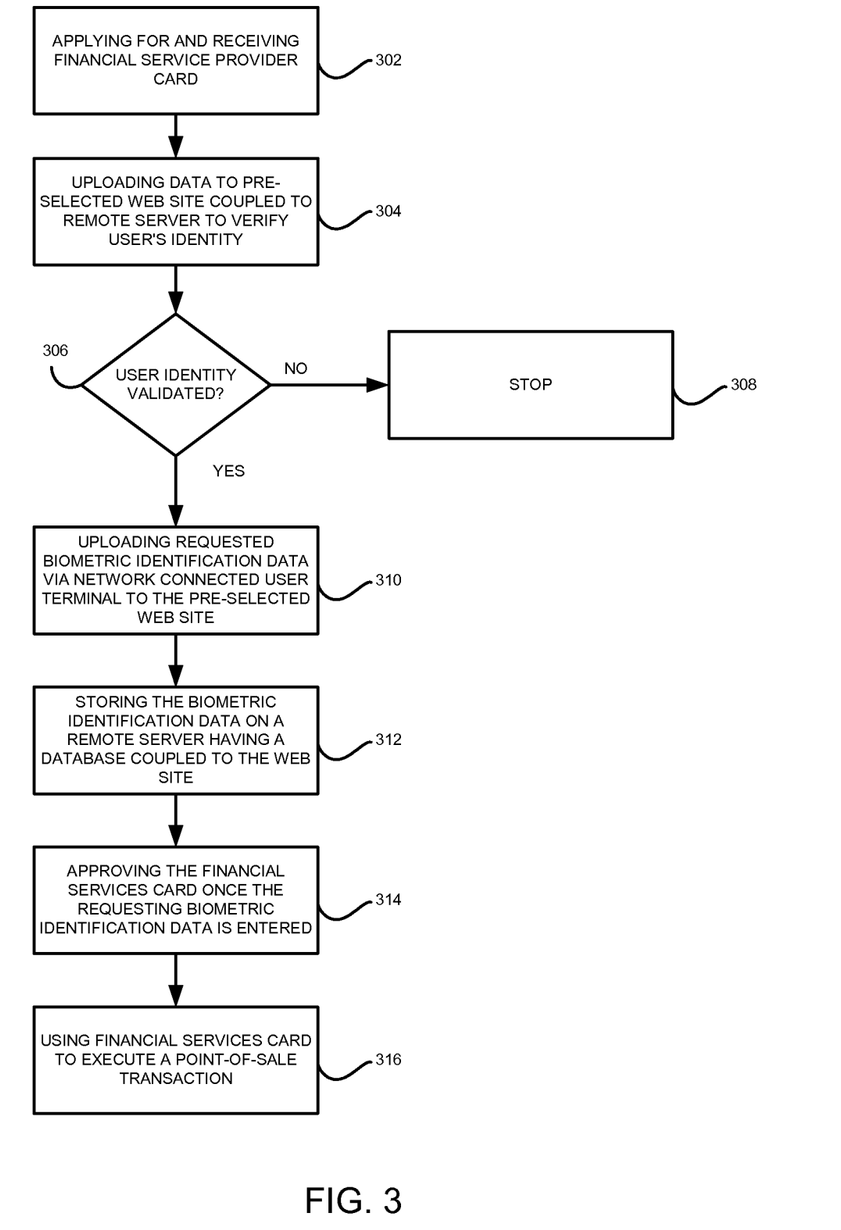
FIG. 3 is a flow chart illustrating a method of issuing a financial service provider card in accordance with the present disclosure.

Referring to FIGS. 1 and 3, a method for issuing the financial services card in accordance with the present disclosure is provided. First, at step 302, the user applies for and receives a financial service provider card. In one embodiment, the application can be filled out manually and sent in through the U.S. Postal system. In another embodiment, the user may fill out an application telephonically. In yet another embodiment, the user can download the application by accessing a preselected website of the financial services card provider that the user wishes to apply for and fill out the necessary fields. Once the user receives the card, the user logs on to a preselected standard identification website, wherein access to the preselected website is provided by the financial service provider, via a network 110 connected user terminal 112. The preselected website is coupled to a remote server 114 having a database 115. Once the user logs on to the preselected website, the user enters identity information that is validated by software including, but not limited to, identity verification software commercially available at NETIDme.com. The standard verification software will validate the user's identity as the true user of the provided financial services card at step 304. If the user's identity is validated, the process moves forward at step 306. If the user's identity is not validated, the process is stopped at step 308.

If the financial service provider approves the credit card, the financial service provider requests the user to provide biometric identification data specific only to the user. In one embodiment, the biometric identification data requested by the financial service provider may be simple biometric identification data or more complex biometric identification information or for the most secure identification of the user a combination of biometric identification data. Biometric identification data may include, but is not limited to, physical features such as face, fingerprint, iris, retina, or hand geometry, or behavioral features, such as signature, voice, or gait, or any other proven form. Note that this is not similar to visually comparing a signature or a photo with an identification card (e.g., Driver's License, etc.). Instead, a digital comparison is made, for example, when a digital signature is uploaded into a database, the user then signs at a point-of-sale terminal, the point-of-sale terminal accesses the network connected remote server data base, compares and verifies that the two signatures belong to the same user or customer. This process applies to all biometric identification data that is uploaded into the remote server database coupled to the preselected website of the financial service card holder. For example, in the case where a digital photo is uploaded, an image of the user may be captured at the point-of-sale terminal and a facial recognition program will compare the captured image to the pre-stored digital image. Furthermore, a user may often change their appearance, e.g. hair color, facial hair, in this instance, a digital photo may be uploaded as often as needed to identify the user.

In another embodiment, more complex biometric identification data may be used including, blood type, a retinal scan, medical and genetic information, a DNA fingerprint, or other types of DNA, a sequence profile or any other such information now known or to be developed in the future. In one embodiment, for instance, if the user has uploaded medical records having the user's requested biometric identification data, a simple device such as a device for measuring glucose levels in a diabetic along with a pH strip could be uploaded at the point-of-sale terminal and compared with the biometric identification data contained in the financial service provider's remote server by accessing the network connected database to verify (as discussed in detail below) many of the more complex biometric identification data.

In step 310, the user uploads the requested biometric identification data via communications network 110 connected user terminal 112 to the preselected website of the financial service provider selected by the user. The biometric identification data requested by the financial service provider is stored on a remote server 114 having a database 115 coupled to the preselected website for storing and processing all the biometric identification data received at step 312. Using standard database software, for example, Microsoft SQL Server™, Oracle Database™, Microsoft Access™, etc., and computer processing power, the biometric identification data that is entered and stored is accessed and sorted to ensure accuracy when retrieving biometric identification data to ascertain a match with biometric identification data entered into a point-of-sale terminal 102.

At step 314, once the financial services card and the biometric identification data is entered and uploaded, the financial services card is approved and ready to be used.

In another embodiment, the financial service provider may choose to verify the biometric identification data and, thus positively verify the identity of the user/applicant. This can be done with the requested biometric identification data. For example, if the financial service provider requests fingerprint scans, digital photographs, DNA fingerprints, etc., these can be checked with some government agencies such as the Department of Motor Vehicles (DMV). Because of the problem with identity theft, especially in the area of credit card applications, if a thief has a social security card of a person, they could create a false identity. If the financial service provider used the biometric identification data to check the user's identity before issuing the card, they may protect themselves from theft. For example, if the financial service provider requests a fingerprint scan and searches an available database for fingerprints, they may find that the fingerprints do not belong to the identified user. The same method would work with a digital photo scan. If the user/applicant was requested to digitally scan a photo, the financial service provider may check a database and find that the user/applicant photo did not match with the identified user.

In step 316, the user may use the card for merchant transactions employing the biometric identification data as positive identification verification for their own protection and the merchants' protection.

Figure 4:
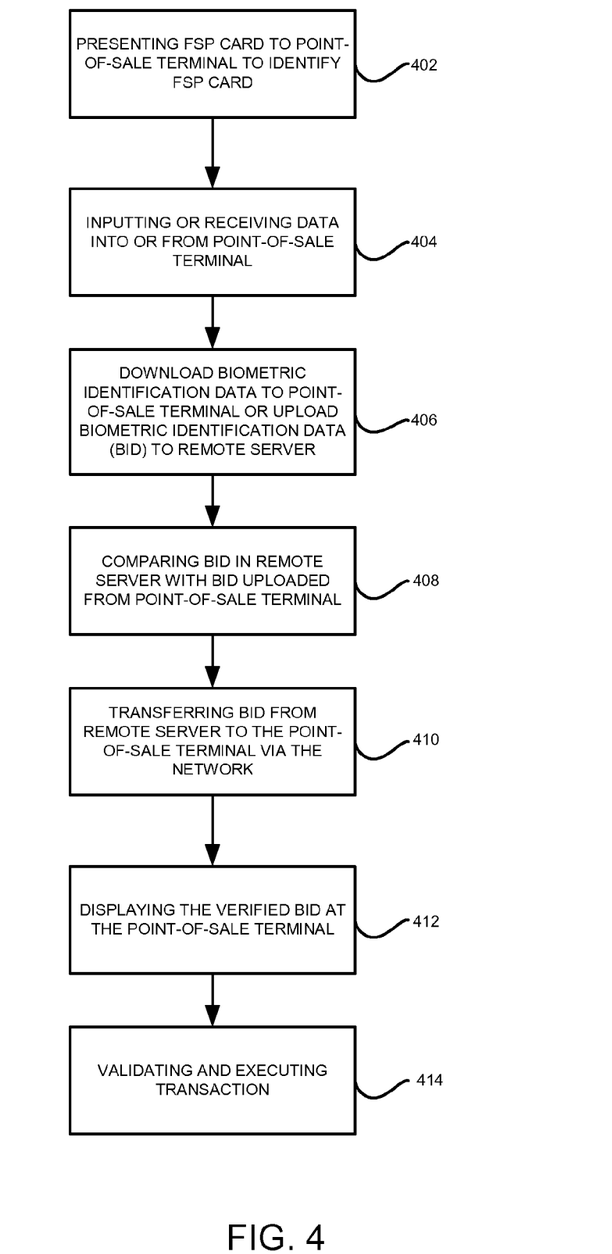
FIG. 4 is a flow chart illustrating a method of effecting a purchase transaction using a financial service provider card in accordance with the present disclosure.

Referring now to FIGS. 1 and 4, a method for authenticating a customer's identification is disclosed. Employing the biometric identification data stored in the database 115 on remote server 114, a positive identification of a customer can be made during a point-of-sale transaction using the financial services provider card of the present disclosure. It is to be appreciated that the verification may take place at the remote server 114 with an indication regarding same sent to the POS terminal 102 or the verification may be made at the POS terminal 102 with the pre-stored data being sent to the POS terminal 102 from the remote server 114.

In step 402, a customer presents their financial service provider card to a merchant for a point-of-sale transaction. The merchant will either direct the customer to swipe the card through the (I/O) terminal 104 or the merchant will swipe the card through the (I/O) terminal 104 themselves. The financial service provider card contains a barcode, other machine readable symbology, a magnetic strip, a radio frequency identification information chip or tag or any type of communication technique that exists now or will work to communicate from the financial service provider card to point-of-sale terminal 102 or remote server 114 in the future. The reader 120 may take the form of but is not limited to a scanner, a RFID reader, a magnetic stripe reader, etc. When the card is read by the point-of-sale terminal 102, the card identity information is transferred from the point-of-sale terminal 102 to the remote server 114 of the financial service provider site wherein the user registered their biometric identification data, in step 404.

The remote server 114 database 115 at the financial service provider site will use standard database software, for example, Microsoft SQL Server™, Oracle Database™, Microsoft Access™, etc., and computer processing power, to access the stored biometric identification data for the identified financial services card.

In one embodiment, the merchant or the customer determines, according to the transaction, which biometric identification data to enter into the (I/O) terminal 104. In another embodiment, the financial service provider may have the system set up such that the server 114 queries through the point-of-sale terminal 102 and informs the merchant which biometric identification data is/are required for the desired transaction. The biometric identification data may then be uploaded to the remote server 114. In another embodiment, the biometric identification data is automatically transmitted via the network 110 connected remote server 114 to the point-of-sale terminal 102 (step 406) for verification at the point-of-sale terminal 102.

If the request for biometric identification data is point-of-sale terminal 102 specific, the customer inputs the required biometric identification data into display/touch screen 126 or 125. In one embodiment, the customer may be required to enter one biometric identification data. In another embodiment, the customer may be required to enter two or more biometric identification data. The biometric identification data is uploaded from the communications network 110 connected point-of-sale terminal 102 to remote server 114 database 115.

In the case of an automatic transfer of biometric identification data from the remote server 114 to the point-of-sale terminal, the biometric identification data is compared by the merchant and depending on its perceived authenticity, it may be validated or it may not. The merchant may wish to inquire further for additional biometric identification data. In this case, the point-of-sale terminal 102 via the network connected remote server, will request additional biometric identification data (step 408). Depending on the processing power of the point-of-sale terminal 102, various algorithms may be employed at the point-of-sale terminal 102 to determine if an acceptable match of pre-stored biometric identification data to entered data has occurred. At that point the merchant may choose to validate the transaction.

In another embodiment, the user entered biometric identification data is compared with all the biometric identification data in the remote server 114 database 115 at step 408. The biometric identification information entered can be any biometric identification data previously requested to be entered and uploaded onto the financial service provider's remote server 114 database 115 through the preselected website. The biometric identification data may be, for example, a digital signature or a finger print scan. The merchant would then enter the biometric identification data and database and computer processing software would search for a matching biometric identification data for the customer (the customer's scanned and uploaded digital signature). The verification (step 410) is made by comparing the biometric identification data entered into the point-of-sale terminal 102 with the biometric identification data that is stored in the network connected remote server 114 database 115. Using standard database software and computer processing power, the biometric identification data that was entered and stored is accessed and sorted to ensure that there is at least one corresponding pair of data to positively verify the identity of the user of the financial services card. In another embodiment, the user or customer enters two biometric identification data, e.g. a digital signature and a fingerprint scan onto display/touch screen 126 or 125. The customer enters both a digital signature and a fingerprint scan onto the display/touch screen 126 or 125 of the communications network 110 connected point-of-sale terminal 102. As set forth above, the communications network 110 connected remote server 114 database 115 searches for a corresponding digital signature and fingerprint scan. If found, the remote server 114 database 115 will ascertain that are two pairs of corresponding biometric identification data and the point-of-sale terminal 102 display/touch screen 126 or 125 will display the matching biometric identification data (step 410) and verify the biometric identification data. In one embodiment, the point-of-sale terminal 102 will only receive an indication that a match has occurred. In a further embodiment, the point-of-sale terminal 102 will be locked out or prevented from completing the transaction if the card holder's identity is not positively established thereby preventing fraud perpetrated by the person operating the point-of-sale terminal 102.

In another embodiment, the merchant may request more complex biometric identification data. For example, if the transaction is a transaction for a very large sum of money, the merchant may request complex biometric identification data such as a retinal scan and a DNA fingerprint. This method would take place in the same manner as the above methods. It would require that the merchant have the ability to obtain a retinal scan and a DNA fingerprint from the customer. It may also take more time for the transaction to process as some of the verification techniques take longer to process.

Once the biometric identification data is verified, the transaction is approved at step 412. At step 414, the transaction is executed.

While this disclosure has been shown and described with reference to certain preferred embodiments thereof, it will be understood by those skilled in the art that various changes in form and detail may be made herein without departing from the spirit and scope of the appended claims.

What is claimed is:

1. A method for verifying the identity of users of financial services provider cards over a network, the method comprising:
    providing a web site for verifying the identity of a user of a financial services provider card, the web site being hosted by at least one server in communication with the network;
    requesting, by the at least one server, a plurality of biometric identification data of the user;
    uploading the plurality of biometric identification data of the user requested by the at least one server via a network connected computing device to the web site;
    authenticating, by the at least one server, the uploaded plurality of biometric identification data with a biometric identification data stored in a related information repository;
    storing the plurality of biometric identification data in a database coupled to the at least one server; and
    uploading biometric identification data provided by the user at a point-of-sale terminal to the at least one server;
    determining, by the at least one server, if the biometric identification data provided by the user at point-of-sale of the terminal matches the biometric identification data retrieved from the database and sending a validation signal to the terminal if the biometric identification data provided by the user at point-of-sale of the terminal matches the biometric identification data retrieved from the database;

receiving the validating signal at the point-of-sale terminal and executing a purchase transaction at a point-of sale terminal.

2. The method as in claim 1, further comprising:
accessing a preselected identification verification web site via the network connected computing device; and
verifying the user's identity using standard verification software to confirm the user's identity as the true user of the financial services card.

3. The method as in claim 1, wherein the requested plurality of biometric identification data includes a face image of the user.

4. The method as in claim 1, wherein the requested plurality of biometric identification data includes a fingerprint of the user.

5. The method as in claim 1, wherein the requested plurality of biometric identification data includes retina data of the user.

6. The method as in claim 1, wherein the requested plurality of biometric identification data includes iris data of the user.

7. The method as in claim 1, wherein the requested plurality of biometric identification data includes hand geometry of the user.

8. The method as in claim 1, wherein the requested plurality of biometric identification data includes a signature of the user.

9. The method as in claim 1, wherein the requested plurality of biometric identification data includes a voice pattern of the user.

10. The method as in claim 1, wherein the requested plurality of biometric identification data includes a medical record of the user.

11. The method as in claim 1, further comprising prompting, by the point-of-sale terminal, the user to provide at least two biometric identification data to verify the point-of-sale transaction.

12. The method as in claim 1, further comprising prompting, by the point-of-sale terminal, the user to provide a digital signature comparison to verify the point-of-sale transaction.

13. The method as in claim 1, further comprising prompting, by the point-of-sale terminal, the user to provide a digital photographic comparison to verify the point-of-sale transaction.

14. The method as in claim 1, further comprising accessing, by the at least one server, the biometric identification data based on an identity of the card.

15. The method as in claim 14, further comprising presenting the card to the point-of-sale terminal to be identified so as to access the at least one server and access the biometric identification data in the database for an identified card.

16. The method as in claim 1, further comprising verifying each of the uploaded plurality of biometric identification data of the user with an external database.

17. A system for using biometric identification data to positively identify users of financial services card, comprising:
a remote server configured for requesting at least one biometric identification data of a user associated with a financial services card, the card being cross associated with a card identity;
a network connected personal computing device configured for uploading the at least one biometric identification data of the user and for transmitting the at least one biometric identification data to be associated with the card to the remote server;
the remote server further configured for authenticating the uploaded plurality of biometric identification data with biometric identification data stored in a related information repository;
and storing a record of the uploaded at least one biometric identification data;
a terminal configured for reading the card identity from the card, prompting the user to input the at least one biometric identification data and for transmitting the card identity and the inputted at least one biometric identification data to the remote server; and
wherein the remote server is configured to verify the biometric identification data for the card for a transaction by retrieving the record of the user's biometric identification data record from the database, determining if the biometric identification data input into the terminal matches the record of biometric identification data retrieved from the database and sending a validation to the terminal if the biometric identification data entered into the terminal matches record of the biometric identification data retrieved from the database.

18. The system as in claim 17, further comprising a second remote server configured for verifying the user's identity to confirm the user's identity as the true user of the financial services card.

19. The system as in claim 17, further comprising an external database for verifying each of the uploaded at least one biometric identification data of the user.

20. A method for verifying the identity of users of financial services provider cards over a network, the method comprising:
uploading biometric identification data provided by the user at a point-of-sale terminal to the at least one server wherein the biometric identification data stored on a user card;
determining, by the at least one server, if the biometric identification data provided by the user card matches the biometric identification data retrieved from the database and sending a validation signal to the terminal if the biometric identification data provided by the user matches the biometric identification data retrieved from the database;
receiving the validating signal at the point-of-sale terminal and executing a purchase transaction at a point-of sale terminal.

21. A computer server configured to:
request at least one biometric identification data of a user associated with a financial services card, the card being cross associated with a card identity;
receive, from a user device, the at least one biometric identification data of the user and for transmitting the at least one biometric identification data to be associated with the card to the remote server;
authenticate the uploaded plurality of biometric identification data with biometric identification data stored in a related information repository;
store a record of the uploaded at least one biometric identification data in a database;
receive biometric identification data for the card for a transaction from a point-of-sale terminal;
verify the biometric identification data for the card for a transaction by retrieving the record of the user's biometric identification data record from the database, determining if the biometric identification data from the point-of-sale terminal matches the record of biometric identification data retrieved from the database and sending a validation to the terminal if the biometric identification data from the point-of-sale terminal matches record of the biometric identification data retrieved from the database.

* * * * *